ically not show any inclination towards the outside

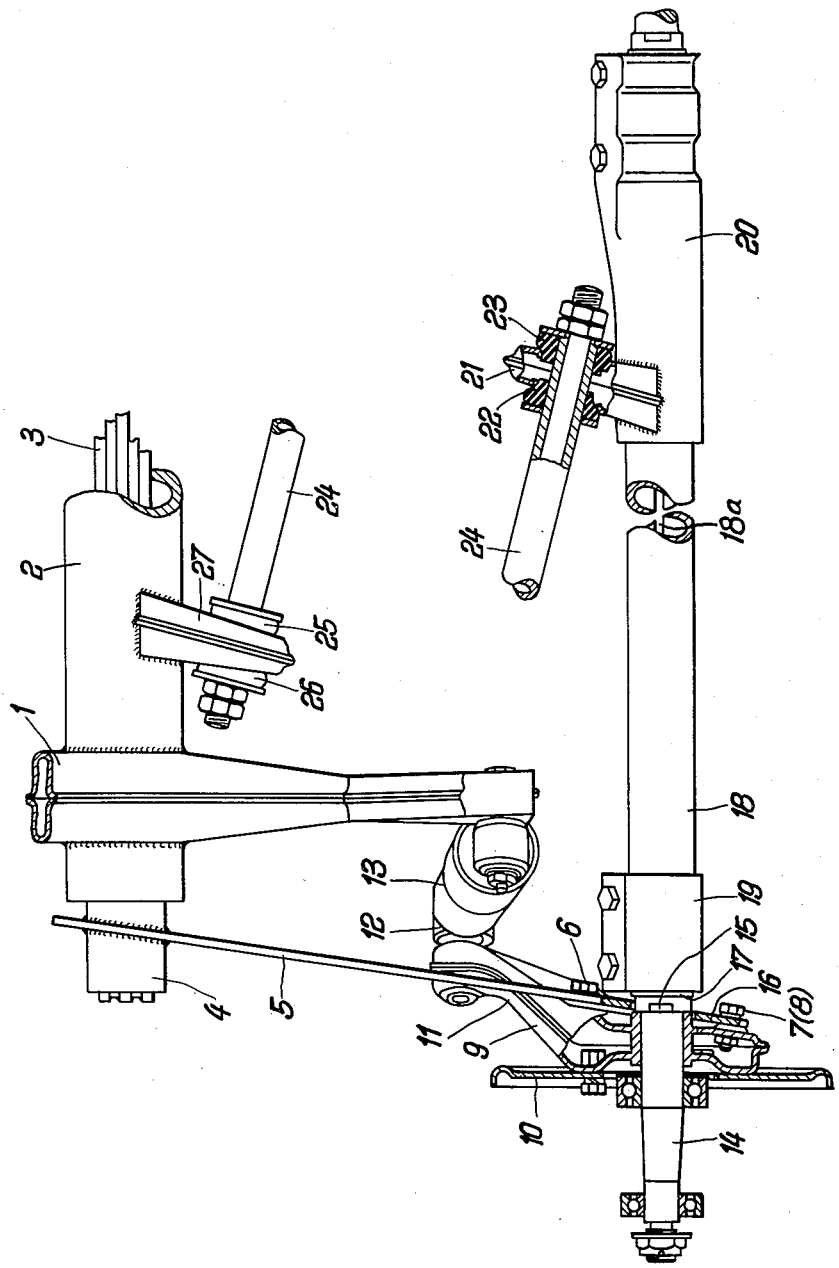

United States Patent Office 3,005,642
Patented Oct. 24, 1961

3,005,642
REAR WHEEL SUSPENSION, PARTICULARLY
FOR MOTOR CARS
Karl Hertel, Dusseldorf, Germany, assignor to
Auto Union G.m.b.H.
Filed Nov. 19, 1959, Ser. No. 854,118
Claims priority, application Germany Nov. 22, 1958
8 Claims. (Cl. 280—124)

The present invention relates to a rear wheel suspension, particularly for motor cars. It is known to suspend the rear wheels by means of elastic crank arms on transverse torsion bars which are anchored to the vehicle frame or body. It is further known to connect the stub axle carriers with each other by means of a torsionally elastic axle beam which is capable of accommodating torsional loading. When negotiating curves, the body of a vehicle equipped with such a rear wheel suspension does practically not show any inclination towards the outside of the curve, because the torsionally elastic axle acts as a stabilizing bar. However, difficulties are encountered in taking up lateral forces acting on the rear wheels, especially when negotiating curves. Flat bars arranged transversely of the elastic crank arms have been proposed for this purpose. It is also known to use as crank arm a stack of leaf springs which decreases in thickness towards the rear. These or similar arrangements require additional torsional or frictional forces which unfavourably influence the softness of the springing.

It is therefore the principal object of the present invention to provide with simple means a soft wheel springing and suspension with low inherent damping which assures stability of the vehicle in turns, and in which the rear wheels are connected by a common axle.

The invention is based on a rear wheel suspension, particularly for motor vehicles, in which the rear wheels are suspended by means of elastic crank arms on torsion bar springs anchored on the vehicle frame or body, and the axle beam connecting the stub axle carriers is made torsionally elastic for the purpose of accommodating torsional loading.

The principal feature of the present invention resides in the fact that each crank arm consists only of one straight leaf spring placed on edge, with associated connecting parts, and the torsionally elastic axle beam is articulated to the frame by means of a single bar which is arranged substantially transversely to the direction of travel of the vehicle. In this manner forces acting in the transverse direction are taken up by the inertia of both wheels and by the bar which is disposed transversely to the direction of travel, without influencing the springing characteristics of the crank arm or the mounting of the torsionally elastic axle beam. It is further of advantage when the carrier of the wheel is bolted to the one end of the leaf spring, and the carrier receives the brake plate and the shock absorber mounting. Thereby the forces occuring during braking as well as those which are produced during the working of the shock absorbers, are transferred to the leaf spring in a simple manner.

Furthermore, it is of advantage to weld the leaf spring at an oblique angle to the sleeve for the torsion bar spring. Thereby the weld becomes longer than would be the case if the leaf spring would be welded on at right angles, and consequently the stress distribution at the weld is more favourable.

According to a further feature of the invention, the bar locating the axle in the transevrse direction is connected to the axle beam and to the frame by means of articulations, at least one of these articulations consisting of elastic material, e.g. rubber. In this manner a maintenance-free articulation is obtained and such an articulation also prevents the transmission of road noises to the vehicle frame and to the body. Preferably, at the other end of the axle beam the stub axle is clamped by means of a sleeve and welded on the end face. Thereby assembly and exchange of parts may be accomplished in a simple manner. The stub axle is provided with flats which co-operate with corresponding abutment surfaces of the end of the leaf spring and of the axle carrier, so that the torsional stresses acting on the torsionally elastic axle beam are transmitted in a simple manner. In order that the resiliency of the leaf spring may not be impaired by resting of the spring against the carrier, the leaf spring is bolted to the carrier with a certain distance. This distance may be determined by the interposition of washers or by means of cup-shaped projections.

For the same reason it is also of advantage if the leaf spring is fastened on the stub axle carrier with only three bolts. In order to provide a favourable arrangement of the shock absorber, the support incorporating the shock absorber mounting passes below the leaf spring.

An embodiment of the invention, which is given by way of example only, is schematically illustrated in the accompanying drawing. In the single figure of the drawing, reference numeral 1 designates the vehicle frame to which is secured a tube 2 which houses a torsion bar spring 3. Sleeves 4 are placed over the ends of torsion bar spring 3 and are attached thereto, and leaf springs 5 are welded to these sleeves at an oblique angle and secured by a nut. The other end of each leaf spring 5 is fastened to the stub axle carrier 9 by means of one screw 6 at the front and two screws 7, 8 at the rear. Washers are placed between the axle carrier and the leaf spring to provide the necessary spacing. Fastened to the opposite side of the axle carrier is the brake plate 10. The stub axle carrier 9 terminates in an extension 11 in which is mounted a bolt for receiving the lower mounting 12 for the shock absorber 13. The stub axle 14 is provided with flats 15 which co-operate with corresponding abutment surfaces in the end 16 of leaf spring 5, thereby preventing relative rotation between the stub axle 14 and the leaf spring 5. On its outer extremity the stub axle further carriers in known manner bearings for receiving the wheel (not shown). At its inner end the stub axle 14 is clamped to the end 17 of the axle beam 18 by means of a sleeve 19. Mounted on the opposite side of the axle beam 18 is a sleeve 20 which substantially corresponds to the sleeve 19 and carries an additional arm 21 for receiving the rubber articulation 22, 23. A bar 24 which may be of tubular form is elastically supported in this articulation in such a manner that it is capable of resilient movement under thrust and pressure. The opposite end of the bar 24 is supported in like manner in the articulation 25, 26 which is rigidly connected to the tube 2 by means of an arm 27.

As may be seen from the foregoing, the axle beam 18 will always maintain constant the distance between the two wheels irrespective of the movements of the wheel suspension. On the other hand, the leaf springs 5 may freely and with minimum resistance be stressed in torsion, whereas they are non-resilient in the direction of springing movement about the axis of torsion bar 3. Consequently, the damping of the wheel suspension movement about the axis of the torsion spring 3 is very small, whereas transverse movement of the axle 18 is taken up by the bar 24, damping out road noises at the same time. The tube constituting the axle beam 18 and having the split 18a, provides resilient and damped resistance against any tilting movement of the vehicle chassis or body, and this resistance may be controlled by the adjustment of the shock absorbers 13.

I claim:
1. In a rear wheel suspension for motor vehicles and the like, a vehicle frame, a torsion bar spring anchored to said vehicle frame, a split tubular torsionally resilient axle beam, an elastic crank arm consisting of a single straight flat leaf spring extending transversely to said torsion bar spring and said axle beam, rear wheel-carrying means connected with one end of said leaf spring and with said axle beam, means connecting the other end of said leaf spring with said torsion bar spring, a sleeve carried by said axle beam, a single bar extending transversely to the direction of the vehicle, means resiliently connecting one end of said bar with said sleeve and means resiliently connecting the other end of said bar with said frame, whereby said bar constitutes the sole articulated connection between said axle beam and said frame.

2. In a rear wheel suspension for motor vehicles and the like, a vehicle frame, a torsion bar spring anchored to said vehicle frame, a split tubular torsionally resilient axle beam, an elastic crank arm consisting of a single straight flat leaf spring extending transversely to said torsion bar spring and said axle beam, a stub axle carrier connected with one end of said leaf spring, a stub axle connected with said stub axle carrier and said axle beam, a brake plate carried by said stub axle carrier, a shock absorber mounting carried by said stub axle carrier, means connecting the other end of said leaf spring with said torsion bar spring, a sleeve carried by said axle beam, a single bar extending transversely to the direction of the vehicle, means resiliently connecting one end of said bar with said sleeve and means resiliently connecting the other end of said bar with said frame, whereby said bar constitutes the sole articulated connection between said axle beam and said frame.

3. In a rear wheel suspension for motor vehicles and the like, a vehicle frame, a torsion bar spring anchored to said vehicle frame, a split tubular torsionally resilient axle beam, a sleeve connected to and extending over one end of said torsion bar spring, an elastic crank arm consisting of a single straight flat leaf spring extending at an oblique angle to said sleeve and having one end firmly connected to said sleeve, rear wheel-carrying means connected with the other end of said leaf spring and with said axle beam, a sleeve carried by said axle beam, a single bar extending transversely to the direction of the vehicle, means resiliently connecting one end of said bar with the last-mentioned sleeve and means resiliently connecting the other end of said bar with said frame, whereby said bar constitutes the sole articulated connection between said axle beam and said frame.

4. In a rear wheel suspension for motor vehicles and the like, a vehicle frame, a torsion bar spring anchored to said vehicle frame, a split tubular torsionally resilient axle beam, an elastic crank arm consisting of a single straight flat leaf spring extending transversely to said torsion bar spring and said axle beam, rear wheel-carrying means connected with one end of said leaf spring and with said axle beam, means connecting the other end of said leaf spring with said torsion bar spring, a sleeve carried by said axle beam, a single bar extending transversely to the direction of the vehicle, a rubber articulation upon one end of said bar, another rubber articulation upon the other end of said bar, means connecting one of said rubber articulations with said sleeve and means connecting the other one of said rubber articulations with said frame, whereby said bar constitutes the sole articulated connection between said axle beam and said frame.

5. In a rear wheel suspension for motor vehicles and the like, a vehicle frame, a torsion bar spring anchored to said vehicle frame, a split tubular torsionally resilient axle beam, an elastic crank arm consisting of a single straight flat leaf spring extending transversely to said torsion bar spring and said axle beam, a stub axle carrier connected with one end of said leaf spring, a stub axle connected with said stub axle carrier, a sleeve connecting said stub axle with said axle beam, said stub axle having an end surface firmly connected with said axle beam, means connecting the other end of said leaf spring with said torsion bar spring, a sleeve carried by said axle beam, a single bar extending transversely to the direction of the vehicle, means resiliently connecting one end of said bar with the last-mentioned sleeve and means resiliently connecting the other end of said bar with said frame, whereby said bar constitutes the sole articulated connection between said axle beam and said frame.

6. In a rear wheel suspension for motor vehicles and the like, a vehicle frame, a torsion bar spring anchored to said vehicle frame, a split tubular torsionally resilient axle beam, an elastic crank arm consisting of a single straight flat leaf spring extending transversely to said torsion bar spring and said axle beam, a stub axle carrier connected with one end of said leaf spring, a stub axle connected with said stub axle carrier and said axle beam, said stub axle having flats engaging said one end of the leaf spring, means connecting the other end of said leaf spring with said torsion bar spring, a sleeve carried by said axle beam, a single bar extending transversely to the direction of the vehicle, means resiliently connecting one end of said bar with said sleeve and means resiliently connecting the other end of said bar with said frame, whereby said bar constitutes the sole articulated connection between said axle beam and said frame.

7. In a rear wheel suspension for motor vehicles and the like, a vehicle frame, a torsion bar spring anchored to said vehicle frame, a split tubular torsionally resilient axle beam, an elastic crank arm consisting of a single straight flat leaf spring extending transversely to said torsion bar spring and said axle beam, a stub axle carrier, screws with spacings connecting said stub axle carrier with one end of said leaf spring, means connecting said stub axle carrier with said axle beam, means connecting the other end of said leaf spring with said torsion bar spring, a sleeve carried by said axle beam, a single bar extending transversely to the direction of the vehicle, means resiliently connecting one end of said bar with said sleeve and means resiliently connecting the other end of said bar with said frame, whereby said bar constitutes the sole articulated connection between said axle beam and said frame.

8. In a rear wheel suspension for motor vehicles and the like, a vehicle frame, a torsion bar spring anchored to said vehicle frame, a split tubular torsionally resilient axle beam, an elastic crank arm consisting of a single straight flat leaf spring extending transversely to said torsion bar spring and said axle beam, a stub axle carrier, three screws, spacing washers carried by said screws, said screws being located around said stub axle carrier and connecting said stub axle carrier with one end of said leaf spring, means connecting said stub axle carrier with said axle beam, means connecting the other end of said leaf spring with said torsion bar spring, a sleeve carried by said axle beam, a single bar extending transversely to the direction of the vehicle, means resiliently connecting one end of said bar with said sleeve and means resiliently connecting the other end of said bar with said frame, whereby said bar constitutes the sole articulated connection between said axle beam and said frame.

References Cited in the file of this patent
UNITED STATES PATENTS

| | | |
|---|---|---|
| 2,069,911 | Bourdon | Feb. 9, 1937 |
| 2,328,740 | Reimspiess | Sept. 7, 1943 |
| 2,734,742 | Schwenk | Feb. 14, 1956 |